United States Patent
Tang et al.

(10) Patent No.: US 11,669,663 B2
(45) Date of Patent: Jun. 6, 2023

(54) WIND TURBINE LAYOUT OPTIMIZATION METHOD COMBINING WITH DISPATCHING STRATEGY FOR WIND FARM

(71) Applicant: ZHEJIANG UNIVERSITY, Zhejiang (CN)

(72) Inventors: Xiaoyu Tang, Hangzhou (CN); Kunwei Lin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/953,382

(22) Filed: Sep. 27, 2022

(65) Prior Publication Data
US 2023/0049193 A1 Feb. 16, 2023

Related U.S. Application Data

(63) Continuation of application No. PCT/CN2021/114405, filed on Aug. 25, 2021.

(30) Foreign Application Priority Data

Aug. 4, 2021 (CN) .......................... 202110889731.6

(51) Int. Cl.
*G06F 30/28* (2020.01)
*F03D 7/04* (2006.01)
*G06F 113/06* (2020.01)

(52) U.S. Cl.
CPC ............. *G06F 30/28* (2020.01); *F03D 7/048* (2013.01); *F05B 2270/204* (2020.08); *G06F 2113/06* (2020.01)

(58) Field of Classification Search
CPC ...... G06F 30/28; G06F 2113/06; G06F 30/25; F03D 7/048; F03D 80/00; F05B 2270/204; Y02B 10/30; G06N 3/006
See application file for complete search history.

(56) References Cited

U.S. PATENT DOCUMENTS

2013/0166082 A1 6/2013 Ambekar

FOREIGN PATENT DOCUMENTS

CN 103793566 A 5/2014
CN 106682282 A 5/2017
(Continued)

OTHER PUBLICATIONS

Philip Asaah, Lili Hao, and Jing Ji, "Optimal Placement of Wind Turbines in Wind Farm Layout Using Particle Swarm Optimization," Journal of Modern Power Systems and Clean Energy, vol. 9, No. 2, Mar. 2021 (Year: 2021).*

(Continued)

*Primary Examiner* — Steven W Crabb
(74) *Attorney, Agent, or Firm* — W&G Law Group (57) ABSTRACT

Disclosed is a wind turbine layout optimization method combining with a dispatching strategy for the wind farm. In the wind farm micro-siting stage, the installed wind turbines number and the arrangement positions are optimized. In this method, the dispatching strategy of wind turbines is considered during the layout optimization of wind turbines, and the axial induction factor of each wind turbine is introduced into the layout optimization variables. The dispatching strategy of maximizing the wind farm power generation is combined with the layout optimization of wind turbines in the construction stage of the wind farm, so that the wake effect is effectively reduced and the capacity cost is reduced, which meet the requirement of actual wind farm. A hybrid optimization algorithm is proposed in this method, with a greedy algorithm to optimize the turbine number and a particle swarm optimization (PSO) algorithm to refine the turbine layout scheme.

2 Claims, 4 Drawing Sheets

(56) References Cited

FOREIGN PATENT DOCUMENTS

| | | |
|---|---|---|
| CN | 106897793 A | 6/2017 |
| CN | 108258724 A | 7/2018 |
| CN | 111461443 A | 7/2020 |
| CN | 111754035 A | 10/2020 |
| CN | 112949087 A | 6/2021 |

OTHER PUBLICATIONS

Prateek Mittal et al., "Novel and Efficient Hybrid Optimization Approach for Wind Farm Micro-siting," IFAC-PapersOnLine 48-8 (2015) 397-402 (Year: 2015).*
Jinkyoo Park, Kincho H. Law, "Layout optimization for maximizing wind farm power production using sequential convex programming," Applied Energy 151 (2015) 320-334 (Year: 2015).*
International Search Report (PCT/CN2021/114405); dated Mar. 28, 2022.
CN First Office Action(202110889731.6); dated Mar. 23, 2022.

* cited by examiner

WIND TURBINE LAYOUT OPTIMIZATION METHOD COMBINING WITH DISPATCHING STRATEGY FOR WIND FARM

CROSS-REFERENCE TO RELATED APPLICATIONS

The present application is a continuation of International Application No. PCT/CN2021/114405, filed on Aug. 25, 2021, which claims priority to Chinese Application No. 202110889731.6, filed on Aug. 4, 2021, the contents of both of which are incorporated herein by reference in their entireties.

TECHNICAL FIELD

The present disclosure relates to a wind turbine layout optimization method in a wind farm, in particular to a wind turbine layout optimization method combining with a dispatching strategy for a wind farm.

BACKGROUND

Energy crisis has become one of the main problems in modern society. The environmental pollution caused by traditional fossil energy is becoming more and more serious. Worldwide, the extensive application of renewable energy has replaced the dependence on traditional energy. Among them, wind energy has become one of the most potential renewable energy sources because of its wide available range, high conversion rate and environmental friendliness. According to the data released by the Global Wind Energy Council, there were 93 GW of new installed capacity in the world in 2020, an increase of 53% compared with that in 2019.

In the fierce competition of the energy market, the development of wind energy is limited by the energy cost. How to reduce the cost and increase the production capacity at the same time is an urgent problem for the development of wind farms. The main research issues of wind farms are divided into three modules, namely, the site selection of the wind farm, the dispatching strategy in the operation process of the wind farm and the maintenance strategy of the wind farm. As the first step, the site selection of the wind farm can be divided into macro-siting and micro-siting. The macro-siting aims at selecting areas with better wind resources. Micro-siting will further optimize the layout of wind turbines after macro-siting, including the number and positions of the wind turbines. The layout solution of the micro-siting affects the total capacity of the wind farm through the wake effect between the wind turbines.

There are two main difficulties in the layout optimization of wind turbines for wind farm micro-siting: wind utilization modeling and resolving the optimization problem. At the level of mathematical modeling, wind turbine layout optimization problem is limited by many constraints, such as complex terrain, ecological impact, wake effect and so on. Taking these constraints into account leads to complicity and difficulty in modelling for wind energy generation and wind farm planning. Meanwhile, the optimization problem is a mixed integer nonlinear programming problem (MINLP). The nonlinearity of its objective function and constraints makes it very difficult to solve the global optimal solution or even difficult to realize. Therefore, the existing solutions mostly use a heuristic algorithm to find an optimized solution to this problem, and the commonly used methods are random search algorithm (RS), genetic algorithm (GA), simulated annealing algorithm (SA), particle swarm optimization (PSO) and advanced pattern search algorithm.

However, in the construction stage of the wind farm, the wind turbine layout optimization is studied as an individual module, and the subsequent wind farm dispatching strategy during daily operation after the farm construction has rarely been considered. The wind farm production capacity maximization is considered, with the assumption of individual turbine maximum power generation, in most of these traditional layout studies. The farm-level dispatching strategy is not taken into account to the wind turbine layout optimization issue.

With the introduction of farm-level control in wind power industry, more and more researches pay attention to the farm-level dispatching strategy of the wind farm. By adjusting the pitch angle, tip speed ratio and yaw angle of each turbine in the wind farm, the influence among turbines can be coordinated, so as to reduce the wake effect in the wind farm and improve the total power production of the wind farm. Since the advent of most direct control strategy, despite of the maximum power point tracking (MPPT) of each turbine, the investigations on wind farm dispatching strategy have paid more and more attention to the goals of maximum production generation, load balance or life balance of wind farm etc. For example, on the basis of considering the wake effects in wind farms, researchers put forward the maximum power point tracking of the wind farm to get the maximum total captured energy of the wind farm. There are also many researchers who put forward the farm-level control strategy of wind turbine load balancing based on the turbine life balancing, or a joint control strategy based on farm-level load balancing and maximum power production. However, most of the researches on wind farm layout optimization during the construction stage is still based on the traditional control strategy that each turbine is set to obtain its maximum power generation. The farm dispatching strategy, which has been proven to effectively improve the whole farm power generation, other than individual turbine maximum power generation, is not considered. In other words, the farm-level dispatching strategy is not considered in the wind turbine layout optimization, which does not achieve the optimal efficiency in actual wind farms.

SUMMARY

The purpose of the present disclosure is to overcome the problems and defects of the existing research, and propose a wind turbine layout optimization method combining with a dispatching strategy for a wind farm. The optimization method optimizes the installation number and layout positions of wind turbines in the design layout stage before the wind farm is constructed. Different from the traditional layout optimization method, which only considers the wind farm power generation maximization under the maximum power generation of each wind turbine. This method incorporates the farm-level wind turbine dispatching strategy after construction of the wind farm into the layout optimization of wind farm micro-siting. It establishes optimization problems and provides solutions, so that the corresponding dispatching strategy of wind farm power generation maximization for given turbine layout can be considered during the turbine layout optimization in the construction stage of the wind farm. This method there by can effectively reduce wake effect and wind power production cost, therefore this method is more practical and beneficial for wind energy utilizations.

The purpose of the present disclosure is realized by the following technical solution, a wind turbine layout optimization method combining with a dispatching strategy for a wind farm, which includes the following steps:

1) Obtaining terrain data, wind speed and direction measurement data and meteorological parameters of a wind farm, and performing wind resource analysis.

2) Dividing the wind farm into grids, according to a result of the wind resource analysis and a requirement of a safe distance between wind turbines. A total number of the grids is a maximum possible number of installed wind turbines, and taking centers of the grids as optional positions of the wind turbines to obtain a set of feasible positions for installation of the wind turbines.

3) Taking the number of the wind turbines to be installed in the area of the wind farm, an arrangement position of each wind turbine, and an axial induction factor of each wind turbine in the dispatching strategy for the wind farm collectively as optimization variables of the wind turbine layout problem. Applying a greedy algorithm to optimize the number of the wind turbine to be installed in a feasible region of the optimization variables. Taking the number of turbines to be installed n with a lowest cost of energy $CoE_n$ as an optimized installation number $n^{opt}$ of wind turbines, and obtaining a preliminary wind turbine arrangement position optimization solution corresponding to $n^{opt}$.

4) Further optimizing the arrangement positions of the $n^{opt}$ wind turbines obtained in step 3), removing restriction of the grids and introducing a penalty function to ensure the safe distance between wind turbines. Optimizing the positions of the $n^{opt}$ wind turbines and axial induction factors by using particle swarm optimization (PSO), so as to further reduce the cost of energy $CoE_{n^{opt}}$. Then obtaining an arrangement position optimization solution of the wind turbines in the continuous spatial positions within the wind farm.

Further, the dispatching strategy for a wind farm is considered in the process of the layout optimization. The turbine number to be installed, the arrangement positions and the axial induction factors of the wind turbines are optimized, and a two-step layout optimization method is used.

In a first step, the greedy algorithm is used to solve an optimization problem of the number of wind turbine to be installed. The number of wind turbine to be installed in the area of the wind farm, the arrangement position and the axial induction factor of each wind turbine thereof are collectively taken as optimization variables. A search domain is a feasible set of the wind farm, which composed of the maximum possible number of wind turbines to be installed, grid-based discrete arrangement positions of wind turbine and an artificially discretized set of the axial induction factors. An optimization objective function is a minimum of the cost of energy CoE. A corresponding individual fitness is composed of the cost of energy $CoE_n$, and the smaller the value of the individual fitness, the better the individual fitness. A calculation formula of the individual fitness fitness1 is:

$$\text{fitness1} = CoE_n = \frac{cost_n}{T_{life} \cdot AEP_n}$$

where $T_{life}$ is an effective life of wind turbines; $cost_n$ is a cost of the turbine location layout optimization solution corresponding to the installation number n, and $AEP_n$ is an annual average energy production of the wind farm corresponding to the optimization solution.

In a second step, on the basis of the preliminary wind turbine arrangement position optimization solution obtained by optimizing the number of wind turbines, the particle swarm optimization algorithm is used for further turbine position optimization. The restriction of the grids is removed, and a penalty function is introduced into a fitness function to ensure the safe distance between wind turbines. The positions of the $n^{opt}$ wind turbine and the axial induction factors are optimized, and the search domain of turbine arrangement positions is continuous. The individual fitness consists of two parts, one is the cost of energy and the other is a function on distances between the wind turbines, the smaller the value of the individual fitness, the better the individual fitness. The calculation formula of the individual fitness fitness2 is:

$$\text{fitness2} = CoE + J \cdot Dis$$

where CoE is the cost of energy corresponding to a wind turbine layout solution combining with the dispatching strategy for the wind farm. The wind turbine layout solution includes two parts: the installation number of the wind turbines and arrangement positions of the wind turbines. J is a set penalty function coefficient, and Dis is a function that is set to ensure the safe distance between wind turbines, an expression of which is:

$$Dis = \sum_{i=1}^{n^{opt}} \sum_{\substack{j=1 \\ j \neq i}}^{n^{opt}} \max\{0, D_s^2 - d_{i,j}^2\}$$

where $D_s$ is the safe distance between wind turbines, and is generally set to be 3D-7 D, where D is the rotor diameter of the wind turbine. $d_{i,j}$ is a straight-line distance between a wind turbine i and a wind turbine j. $n^{opt}$ is the installation number of the wind turbines after optimization in the first step.

Compared with the prior art, the present disclosure has the following advantages:

1. Strong practicability. In this layout optimization method, the dispatching strategy for the wind farm is considered in the layout optimization of wind turbines. Different from the traditional layout optimization method, which only considers the wind farm power generation maximization under the maximum power generation of each turbine. This method combines the dispatching strategy of farm-level capacity maximization with the turbine layout optimization in the wind farm construction stage. This method can effectively further reduce the wake effect and wind power production cost, which is more in line with the actual demands of the wind farm.

2. The implementation framework of the method in the present disclosure is advanced, which ensures the feasibility of the solution and the quality of the solution. In this layout optimization method, a greedy algorithm is applied to optimize the installation number of wind turbines, which greatly reduces the computational complexity and ensures the quality of the obtained preliminary layout solution. Then the particle swarm optimization algorithm is applied to further optimize the wind turbine layout optimization solution for continuous spatial positions.

3. Good expansibility. The two-step optimization method can be effectively extended to solution of similar problems.

DESCRIPTION OF EMBODIMENTS

The implementation of the present disclosure will be described in detail with reference to the following drawings:

EMBODIMENTS

Figure 1:
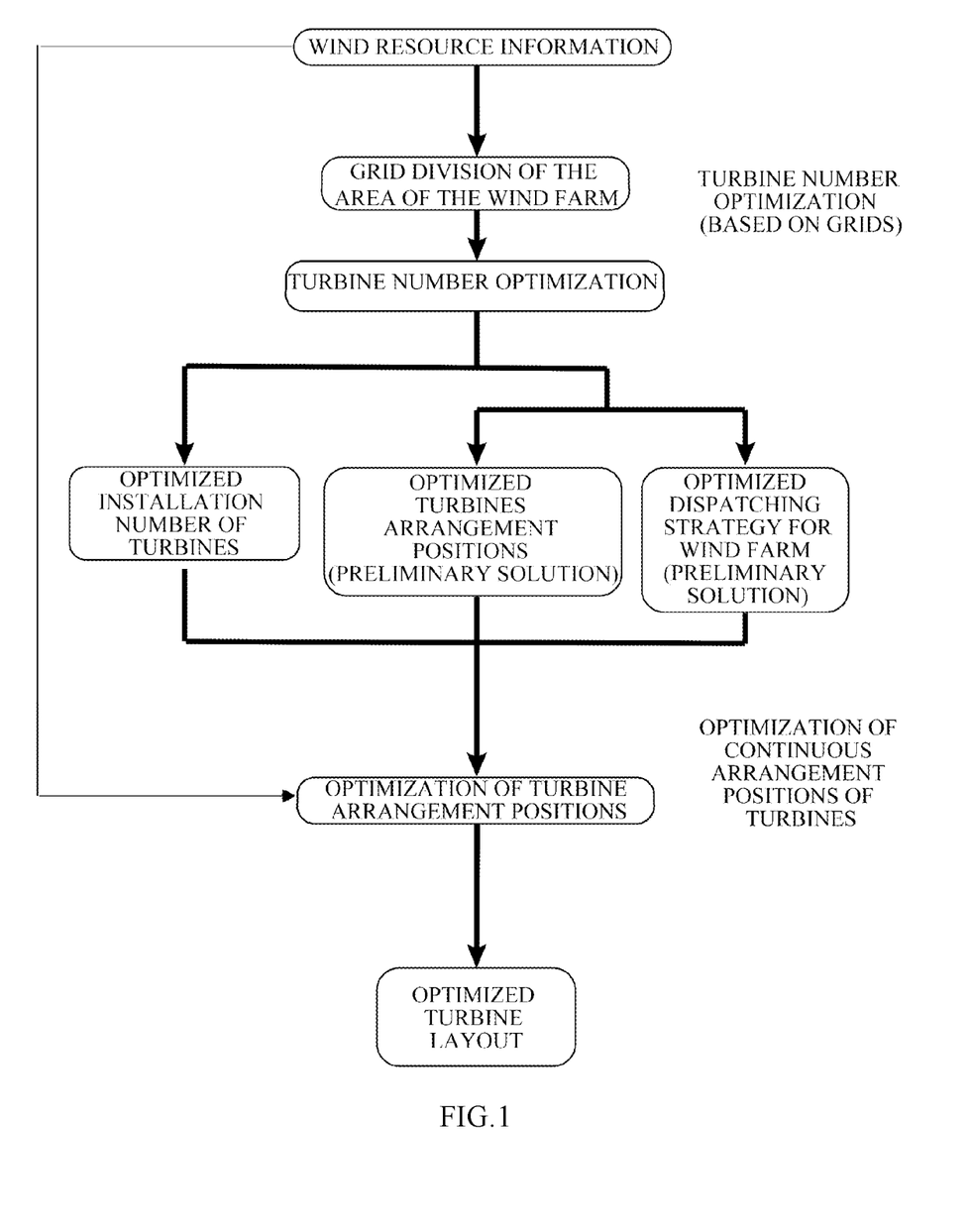
FIG. 1 is a flow chart of the method of the present disclosure.

In this embodiment, the turbine layout optimization in the wind farm construction stage is carried out for a wind farm. Wind turbines with a rated power of 1.5 MW and a diameter D of the impeller face of 77 meters are assembled in a square wind farm area with a side length of 1,232 meters. It is assumed that the abscissa of the wind farm area is 0-1232 m and the ordinate is 0-1232 m. The wind turbine layout optimization research is carried out with a wind speed of 8 m/s in a westerly wind direction, and the feasible domain for the layout is the whole wind farm. In the wind turbine layout optimization framework combining with the dispatching strategy for the wind farm, the first optimization goal is to minimize the cost of energy of the wind farm on the premise of ensuring that the safe distance is 4 D based on grid division; the second optimization goal is to minimize the cost of energy of the wind farm with a penalty function is introduced to ensure the safety distance is 4 D. The flowchart of the whole process is shown in FIG. 1. The implementation steps are as follows:

1) Obtaining terrain data, wind speed and direction measurement data and meteorological parameters of a wind farm, and performing wind resource analysis.

2) According to a result of the wind resource analysis and a requirement of a safe distance between wind turbines, dividing the wind farm into grids. A total number of the grids is a maximum number of the wind turbines that can be installed, and taking centers of the grids as optional positions of the wind turbines to obtain a set of feasible positions for turbine installation.

3) Taking the number of the wind turbines to be installed in the wind farm, an arrangement position of each wind turbine, and an axial induction factor of each wind turbine in the dispatching strategy for the wind farm collectively as optimization variables of the turbines layout problem. Applying a greedy algorithm to optimize the number of the wind turbine in a feasible region of the optimization variables. Taking the installation number n of wind turbines with a lowest cost of energy $CoE_n$ as an optimized installation number $n^{opt}$ of the wind turbines, and obtaining a preliminary wind turbine arrangement position optimization solution corresponding to $n^{opt}$.

4) Further optimizing the arrangement positions of the $n^{opt}$ wind turbines obtained in step 3), removing restriction of the grids and introducing a penalty function to ensure the safe distance between the wind turbines. Optimizing the positions of the $n^{opt}$ wind turbines and the corresponding axial induction factors by using particle swarm optimization, so as to further reduce the cost of energy $CoE_{n^{opt}}$ and obtain a turbine arrangement position optimization solution in the continuous spatial positions within the wind farm.

The installation number, the arrangement positions and the axial induction factors of wind turbines are optimized, and a two-step layout optimization method is used.

In a first step, the greedy algorithm is used to solve an optimization problem of optimizing the installation number of the wind turbines. The installation number of the wind turbines in the area of the wind farm, the arrangement position of each wind turbine and the axial induction factor thereof are collectively taken as optimization variables. A search domain is a feasible set of the wind farm composed of the maximum number of wind turbines that can be installed, grid-based discrete arrangement positions of the wind turbine and an artificially discretized set of the axial induction factors. An optimization objective function is a minimum of the cost of energy CoE. A corresponding individual fitness is composed of the cost of energy $CoE_n$, and the smaller the value of the individual fitness, the better the individual fitness. A calculation formula of the fitness fitness1 is:

$$\text{fitness1} = CoE = \frac{cost_n}{T_{life} \cdot AEP_n}$$

where $T_{life}$ is an effective life of wind turbines; $cost_a$ is a cost of the turbine location layout optimization solution corresponding to the installation number n, and AEP is an annual average energy production of the wind farm corresponding to the optimization solution.

In a second step, on the basis of the preliminary wind turbine arrangement position optimization solution obtained by optimizing the number of wind turbines, the particle swarm optimization algorithm is used for further turbine position optimization. The restriction of the grids is removed, and a penalty function is introduced into a fitness function to ensure the safe distance between wind turbines. The positions of the $n^{opt}$ wind turbine and the axial induction factors are optimized, and the search domain of turbine arrangement positions is continuous. The individual fitness consists of two parts, one is the cost of energy and the other is a function on distances between the wind turbines, the smaller the value of the individual fitness, the better the individual fitness. The calculation formula of the individual fitness fitness2 is:

$$\text{fitness2} = CoE + J \cdot Dis$$

where CoE is the cost of energy corresponding to a wind turbine layout solution combining with the dispatching strategy for the wind farm. The wind turbine layout solution includes two parts: the installation number of the wind turbines and arrangement positions of the wind turbines. J is a set penalty function coefficient, and Dis is a function that is set to ensure the safe distance between wind turbines, an expression of which is:

$$Dis = \sum_{i=1}^{n^{opt}} \sum_{\substack{j=1 \\ j \neq i}}^{n^{opt}} \max\{0, D_s^2 - d_{i,j}^2\}$$

where $d_{i,j}$ is the straight-line distance between a wind turbine i and a wind turbine j; $n^{opt}$ is the installation number of the wind turbines after optimization in the first step; $D_s$ is the safe distance between the wind turbines, which is set to 4 times the rotor diameter of the wind turbine in this embodiment, i. e., 4 D.

Figure 2:
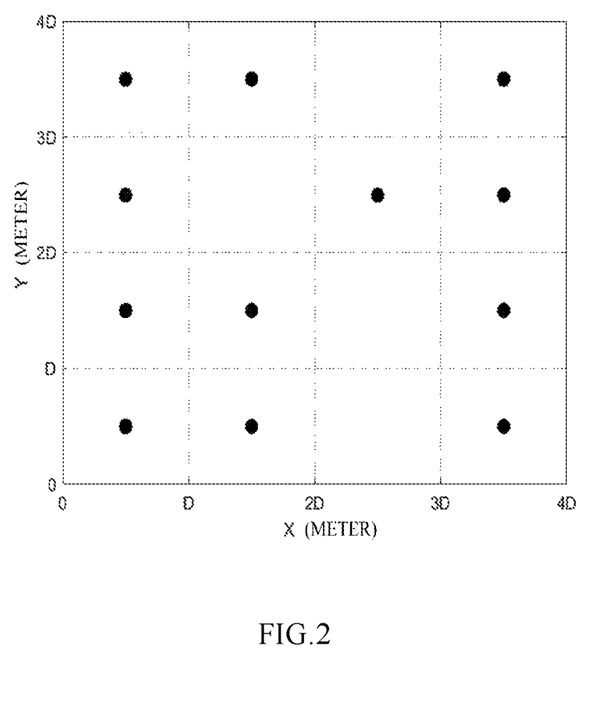
FIG. 2 is a result of layout optimization based on grid division according to an embodiment of the present disclosure.
Figure 3:
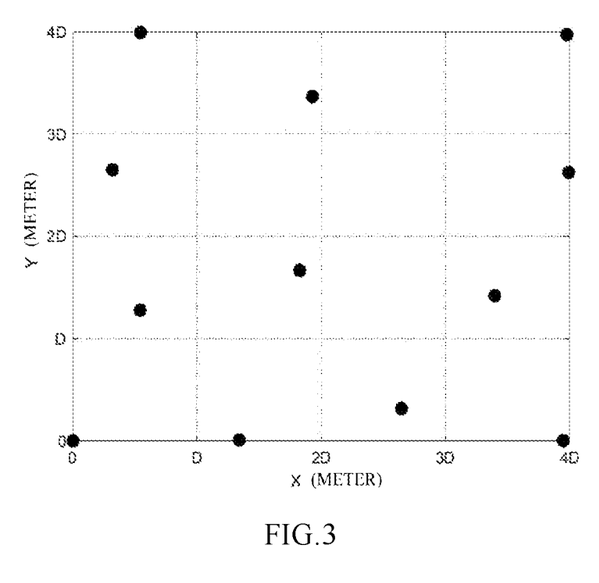
FIG. 3 is a result of layout optimization based on continuous arrangement positions according to an embodiment of the present disclosure.

The above wind turbine layout optimization method combining with a dispatching strategy for a wind farm mainly includes grid division of the wind farm, application of the greedy algorithm to optimize the installation number of wind turbines in grid-based wind farm, removal of restriction of the grids, introduction of a penalty function, and application of the particle swarm optimization to further optimize the arrangement positions of wind turbines. In the embodiment, the wind turbine layout optimization calculation is carried out according to the flowchart shown in FIG. 1. FIG. 2 is the layout result of the wind turbine layout optimization method based on grid division combining with the dispatching strategy according to the present disclosure, namely, the layout result of the first step optimization. FIG. 3 is the layout result obtained by the wind turbine layout optimization method based on the continuous arrangement positions of wind turbines combining with the dispatching strategy according to the present disclosure, namely, the layout result of the second step optimization.

Figure 4:
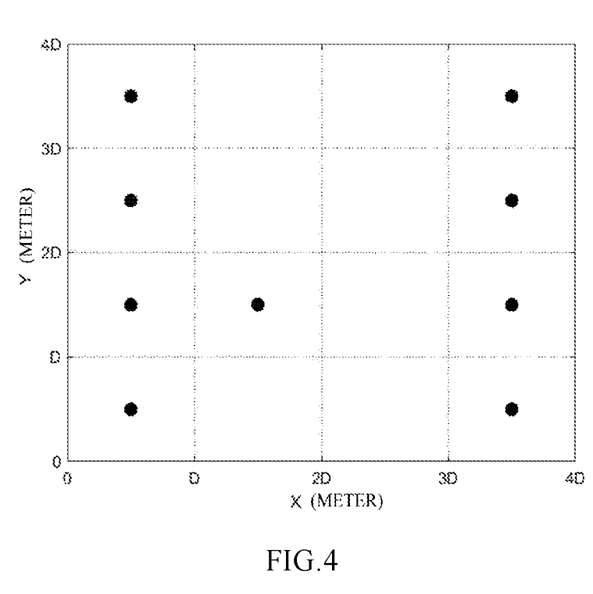
FIG. 4 is a layout result of a wind farm based on grid division without considering dispatching strategy according to an embodiment.

FIG. 4 is the layout result of the wind turbine layout optimization method based on grid division without considering dispatching strategy. In this embodiment, the safe distance of the wind turbines is 4 D, and there are 16 grid centers where wind turbines can be placed. Table 1 shows the comparison of the results between the wind turbine layout method based on grid division without considering the dispatching strategy and the wind turbine layout optimization method combining with the dispatching strategy for the wind farm. It can be seen that the wind turbine layout optimization method combining with the dispatching strategy for the wind farm of the present disclosure is much better than the wind turbine layout method based on grid division without considering the dispatching strategy, in terms of annual energy production and cost of energy. The method of the present disclosure combines the dispatching strategy of maximizing the wind farm capacity with the layout optimization of wind turbine, effectively reduces the wake effect and the wind power capacity cost, which is more in line with the actual demands of the wind farm.

TABLE 1

| Wind motor layout Optimization method | Annual energy production (MWh/year) | Cost of energy (RMB/kWh) | Installation number |
| --- | --- | --- | --- |
| Wind turbine layout Optimization method based on grid division without considering dispatching strategy | 3.927 * 10³ | 1.931 | 9 |
| Wind turbine layout optimization method based on grid division combining with dispatching strategy for wind farm (first step of optimization) | 4.498 * 10³ | 1.087 | 12 |
| Wind turbine layout optimization method based on continuous arrangement positions of wind turbines combining with dispatching strategy for the wind farm (second step of optimization) | 4.608 * 10³ | 1.061 | 12 |

The above embodiment is only a preferred embodiment of one or more embodiments of this description, and it is not intended to limit one or more embodiments of this description. Any modification, equivalent substitution, improvement and the like made within the spirit and principle of one or more embodiments of this description should be included in the scope of protection of one or more embodiments of this description.

What is claimed is:

1. A wind turbine layout optimization method combining with a dispatching strategy for a wind farm, comprising the following steps:

step 1): obtaining terrain data, wind speed and direction measurement data and meteorological parameters of a wind farm, and performing wind resource analysis;

step 2): dividing the wind farm into grids, according to a result of the wind resource analysis and a requirement of a safe distance between wind turbines, wherein a total number of the grids is a maximum possible number of installed wind turbines;

taking centers of the grids as optional positions of the wind turbines to obtain a set of feasible positions for installation of the wind turbines;

step 3): taking the number of the wind turbines to be installed in the area of the wind farm, an arrangement position of each wind turbine, and an axial induction factor of each wind turbine in the dispatching strategy for the wind farm collectively as optimization variables of a layout of wind turbines; applying a greedy algorithm to optimize the number of the installed wind turbines in a feasible region of the optimization variables; taking an installation number n of wind turbines with a lowest cost of energy $CoE_n$ as an optimized installation number $n^{opt}$ of wind turbines; then obtaining a preliminary wind turbine arrangement position optimization solution corresponding to $n^{opt}$, wherein in the process of optimization, a corresponding individual fitness is composed of the cost of energy $CoE_n$, and a calculation formula of the individual fitness fitness1 is:

$$\text{fitness1} = CoE_n = \frac{cost_n}{T_{life} \cdot AEP_n}$$

where $T_{life}$ is an effective life of wind turbines, $cost_n$ is a cost of the turbine location layout optimization solution corresponding to the installation number n, and $AEP_n$ is an annual average energy production of the wind farm corresponding to the optimization solution;

step 4): optimizing the arrangement positions of the $n^{opt}$ wind turbines obtained in step 3), removing restriction of the grids, introducing a penalty function to ensure the safe distance between the wind turbines, and optimizing the positions of the $n^{opt}$ wind turbines and axial induction factors thereof by using particle swarm optimization, so as to reduce the cost of energy $CoE_{n^{opt}}$ and obtain an arrangement position optimization solution of the wind turbines in the continuous spatial positions within the wind farm; wherein in the process of optimization, the individual fitness consists of two parts, one of which is the cost of energy and the other of which is a distance function between the wind turbines, and the calculation formula of the individual fitness fitness2 is:

fitness2=$CoE+J \cdot Dis$ where CoE is the cost of energy corresponding to a wind turbine layout solution combining with the dispatching strategy for the wind farm; the wind turbine layout solution includes two parts: the installation number of the wind turbines and arrangement positions of the wind turbines; J is a set penalty function coefficient, and Dis is a function that is set to ensure the safe distance between wind turbines, an expression of which is:

$$Dis = \sum_{i=1}^{n^{opt}} \sum_{\substack{j=1 \\ j \neq i}}^{n^{opt}} \max\{0, D_s^2 - d_{i,j}^2\}$$

where $d_{i,j}$ is the straight-line distance between a wind turbine i and a wind turbine j;

wherein in the layout optimization of the wind turbines according to the method, taking the dispatching strategy for the wind farm into account, the axial induction factor of each wind turbine is introduced into the layout optimization variables of wind turbines, and the dispatching strategy of maximizing a wind farm production capacity is combined with the layout optimization of wind turbines in a construction stage of the wind farm; a greedy algorithm is applied to ensure the quality of the layout solution, and then a particle swarm optimization algorithm is applied to optimizing the wind turbine layout solution for continuous spatial positions.

2. The wind turbine layout optimization method combining with a dispatching strategy for a wind farm according to claim 1, wherein the dispatching strategy for the wind farm is considered in the process of the layout optimization, and the installation number, the arrangement positions and the axial induction factors of the wind turbines are optimized, and a step-by-step layout optimization method is used;

in a first step, the greedy algorithm is used to solve an optimization problem of optimizing the installation number of wind turbines; the installation number of wind turbines in the area of the wind farm, the arrangement position of each wind turbine and the axial induction factor thereof are collectively taken as optimization variables; a search domain is a feasible set of the wind farm composed of the maximum number of the wind turbines that can be installed, grid-based discrete arrangement positions of the wind turbine and an artificially discretized set of the axial induction factors; an optimization objective function is a minimum of the cost of energy;

in a second step, on the basis of the preliminary wind turbine arrangement position optimization solution obtained by optimizing the number of the wind turbines, the particle swarm optimization algorithm is used for further optimization, the restriction of the grids is removed, and the penalty function is introduced into a fitness function to ensure the safe distance of the wind turbines; the positions of the $n^{opt}$ wind turbine and the axial induction factors are optimized, and the search domain of the arrangement positions of the wind turbine is continuous.

* * * * *